United States Patent
Wu et al.

(10) Patent No.: US 10,387,395 B2
(45) Date of Patent: Aug. 20, 2019

(54) PARALLELIZED EXECUTION OF WINDOW OPERATOR

(71) Applicants: Di Wu, Seoul (KR); Boyung Lee, Seoul (KR); Yongsik Yoon, Walldorf (DE)

(72) Inventors: Di Wu, Seoul (KR); Boyung Lee, Seoul (KR); Yongsik Yoon, Walldorf (DE)

(73) Assignee: SAP SE, Walldorf (DE)

( * ) Notice: Subject to any disclaimer, the term of this patent is extended or adjusted under 35 U.S.C. 154(b) by 422 days.

(21) Appl. No.: 14/531,406

(22) Filed: Nov. 3, 2014

(65) Prior Publication Data
US 2016/0125009 A1    May 5, 2016

(51) Int. Cl.
*G06F 16/22*   (2019.01)
*G06F 16/27*   (2019.01)
*G06F 16/2455* (2019.01)

(52) U.S. Cl.
CPC ...... *G06F 16/221* (2019.01); *G06F 16/24554* (2019.01); *G06F 16/278* (2019.01)

(58) Field of Classification Search
CPC ......... G06F 17/30315; G06F 17/30486; G06F 17/30584; G06F 17/30339; G06F 17/30598; G06F 17/3028; G06F 17/3053; G06F 17/30705; G06F 17/30289; G06F 17/30292
USPC ............................. 707/601, 741, 737, 752
See application file for complete search history.

(56) References Cited

U.S. PATENT DOCUMENTS

| | | | |
|---|---|---|---|
| 6,430,550 B1* | 8/2002 | Leo | G06F 17/30445 707/623 |
| 6,775,681 B1* | 8/2004 | Ballamkonda | G06F 17/30454 707/718 |
| 6,820,095 B1 | 11/2004 | Yeung et al. | |
| 6,820,262 B1* | 11/2004 | Tellez | G06F 9/5083 718/106 |
| 7,035,851 B1* | 4/2006 | Sinclair | G06F 17/30339 |
| 8,782,100 B2 | 7/2014 | Yoon et al. | |
| 9,852,184 B2 | 12/2017 | Lee et al. | |
| 2001/0011268 A1* | 8/2001 | Tsuchida | G06F 9/5083 |
| 2005/0044102 A1 | 2/2005 | Gupta et al. | |
| 2006/0190947 A1* | 8/2006 | Ghosh | G06F 9/5005 719/313 |
| 2006/0253473 A1* | 11/2006 | Agrawal | G06F 17/30584 |
| 2008/0133447 A1 | 6/2008 | Barsness et al. | |
| 2008/0228829 A1 | 9/2008 | Crutchfield et al. | |
| 2009/0144346 A1* | 6/2009 | Duffy | G06F 17/30445 |

(Continued)

OTHER PUBLICATIONS

Pavlo et al, "Skew-Aware Automatic Database Partitioning in Shared-Nothing, Parallel OLTP Systems", SIGMOD'12, May 20-24, 2012, Scottsdale, Arizona, pp. 61-72.*
Melton, "Information technology—Database languages—SQL—Part 2: Foundation (SQL/Foundation)," Aug. 2003, 1332 pages.
"Window Functions," SAP HANA Reference, help.sap.com, 2012, 2 pages.

(Continued)

*Primary Examiner* — Jeff A Burke
*Assistant Examiner* — Kamal K Dewan
(74) *Attorney, Agent, or Firm* — Klarquist Sparkman, LLP

(57) ABSTRACT

A window operator can be processed according to a variety of techniques that introduce parallelism. Window function sub-results can be calculated separately on different nodes. Overall superior performance can result. Skewness in input data can be accounted for by controlling a degree of parallelism at nodes.

20 Claims, 10 Drawing Sheets

(56) References Cited

U.S. PATENT DOCUMENTS

| | | | |
|---|---|---|---|
| 2011/0016160 A1* | 1/2011 | Zhang | G06F 17/30386 707/805 |
| 2012/0041976 A1* | 2/2012 | Annapragada | G06F 17/30545 707/770 |
| 2012/0191699 A1 | 7/2012 | Geoge et al. | |
| 2013/0166589 A1* | 6/2013 | Baeumges | G06F 17/30486 707/769 |
| 2013/0166606 A1* | 6/2013 | Fricke | G06F 17/30584 707/803 |
| 2013/0318123 A1* | 11/2013 | Annapragada | G06F 17/30545 707/770 |
| 2014/0012877 A1 | 1/2014 | Krishnamurthy | |
| 2014/0214799 A1* | 7/2014 | Li | G06F 17/30445 707/718 |
| 2015/0302035 A1 | 10/2015 | Raghavan et al. | |

OTHER PUBLICATIONS

"SQL: How does parallelism of a join operation exactly work in a 'shared nothing' architecture?" stackoverflow, Sep. 13, 2012, 2 pages.

White, "Understanding and Using Parallelism in SQL Server," simple talk, Red Gate Software, Mar. 3, 2011, 17 pages.

"Oracle parallel/partition aware SQL tips," Oracle Tips by Burleson Consulting, dba-oracle.com, Jan. 25, 2012, 4 pages.

Paulley et al, "Analytic Functions in SQL Anywhere," Jul. 18, 2007, 46 pages.

Hinsberger, "The Window Operator and Window Aggregate Functions," SAP SQL Anywhere blog post, Jan. 29, 2014, 4 pages.

"Operators," Oracle® CEP CQL Language Reference, oracle.com, Oct. 2009, 17 pages.

* cited by examiner

PARALLELIZED EXECUTION OF WINDOW OPERATOR

BACKGROUND

Window functions were added to the SQL database standard in 2003. Such functions have a variety of uses and can be implemented by any database system. However, as the size of a database grows, it become more difficult to perform window functions, and performance suffers.

There is therefore room for improvement.

SUMMARY

The Summary is not intended to identify key features or essential features of the claimed subject matter, nor is it intended to be used to limit the scope of the claimed subject matter.

An embodiment can be implemented as a method comprising assigning table rows of a database to different nodes based on one or more partition columns of the table rows specified in a window operator; with the assigned table rows, calculating window function sub-results locally at the different nodes; and combining the local window function sub-results into an overall window function result of the window operator.

An embodiment can be implemented as a system comprising a database table comprising a plurality of database table rows comprising a plurality of columns; a window function calculation orchestrator configured to receive a window operator comprising one or more partition columns of the database table and one or more sorting columns of the database table, wherein the window function calculation orchestrator is configured to assign the database table rows to a plurality of different nodes based on the one or more partition columns; the plurality of different nodes, wherein the plurality of different nodes are configured to calculate window function sub-results locally for the window operator; and an overall window function result of the window operator constructed from the window function sub-results at the different nodes As described herein, a variety of other features and advantages can be incorporated into the technologies as desired.

An embodiment can be implemented as one or more computer readable media comprising computer-executable instructions that when executed by a computing system perform a method comprising receiving rows of a database table comprising a plurality of columns; receiving an indication that a window function is to be performed on the rows, wherein the indication comprises a window operator comprising at least one partition column and at least one sorting column, wherein the partition column is a column of the database table, and the sorting column is a column of the database table; evenly dividing the rows among a plurality of assigning nodes as initial subsets of the rows; via the assigning nodes, assigning in parallel the initial subsets of the rows to respective different window nodes as different merged-separated row groups according to row values of the partition column; via the different window nodes, sorting in parallel the different merged-separated row groups according to the sorting column; via the different window nodes executing, locally generating in parallel window function sub-results via the sorted merged-separated row groups; and combining the window function sub-results into an overall window function result for the window operator.

DETAILED DESCRIPTION

Example 1—Example Overview

The technologies described herein can be used for scenarios involving a window operator. As described herein, parallelized execution of a window function for the window operator can result in superior performance.

In situations involving multiple nodes, the calculation can be tailored to the number of nodes, avoiding conflict between executing threads. Such an approach can account for skewness in the input data.

The technologies can be helpful to improve calculation performance where a window operator is involved. Therefore, the technologies can be included in developer tools, database optimization engines, and the like. End users can benefit from the technologies because they can save time and computing resources.

Figure 1:
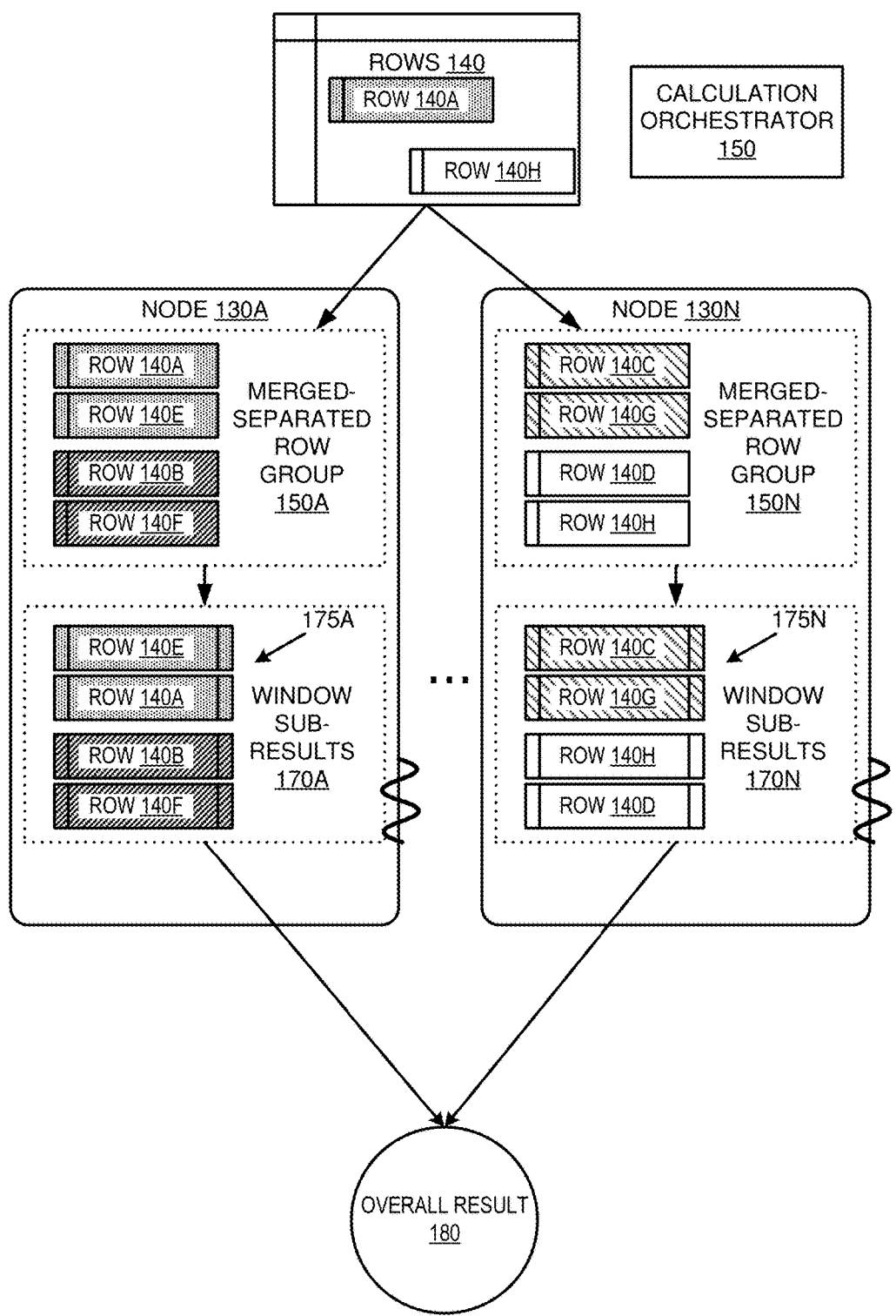
FIG. 1 is a block diagram of an example system implementing parallelized execution of a window operator.

Example 2—Example System Implementing Parallelized Execution of Window Operator FIG. 1 is a block diagram of an example system 100 implementing parallelized execution of a window operator as described herein. In the example, a plurality of different nodes 130A-N can calculate the window function in parallel. Although two nodes are shown, in practice, a larger number of nodes can be used.

In the example, a database table comprises a plurality of database table rows 140. In any of the examples herein, such rows can comprise a plurality of columns, including one or more partition columns specified by the window operator, one or more sorting columns specified by the window operator, and the like. Such columns can be received as part of the window function calculation process (e.g., receiving an indication that a window operator is to be performed on the database table columns).

A window function calculation orchestrator 150 is configured to receive a window operator comprising one or more partition columns of the database table and one or more sorting columns of the database table. The orchestrator 150 is configured to assign the database table rows 140 to a plurality of different nodes 130A-N based on the one or more partition columns.

For example, the rows 140 can be placed into merged-separated row groups 150A-N as shown. Such merged-separated row groups 150A-N are grouped according to the one or more partition columns as described herein.

The nodes 130A-N are configured to calculate window function sub-results 170A-N locally for the window operator (e.g., as specified in the window operator). The sub-results 170A-N can include an added column 175A-N in accordance with the window operator (e.g., rank, count, or the like). The different nodes 130A-N can calculate the window function sub-results in parallel as described herein.

An overall window function result 180 can be constructed from the window function sub-results 170A-N at the different nodes 130A-N.

In practice, the systems shown herein, such as system 100, can vary in complexity, with additional functionality, more complex components, and the like. For example, additional components can be included to implement security, redundancy, load balancing, report design, single sign on, and the like. In practice, a calculation orchestrator 150 can run on a shown node, run on another node, or be distributed among different nodes separate from and/or including the shown nodes 130A-N.

The system 100 and any of the other systems described herein can be implemented in conjunction with any of the hardware components described herein, such as the computing systems described below (e.g., processing units, memory, and the like). In any of the examples herein, the inputs, outputs, rows, results, and orchestrators can be stored in one or more computer-readable storage media or computer-readable storage devices. The technologies described herein can be generic to the specifics of operating systems or hardware and can be applied in any variety of environments to take advantage of the described features.

Example 3—Example Method Implementing Parallelized Execution of Window Operator

Figure 2:
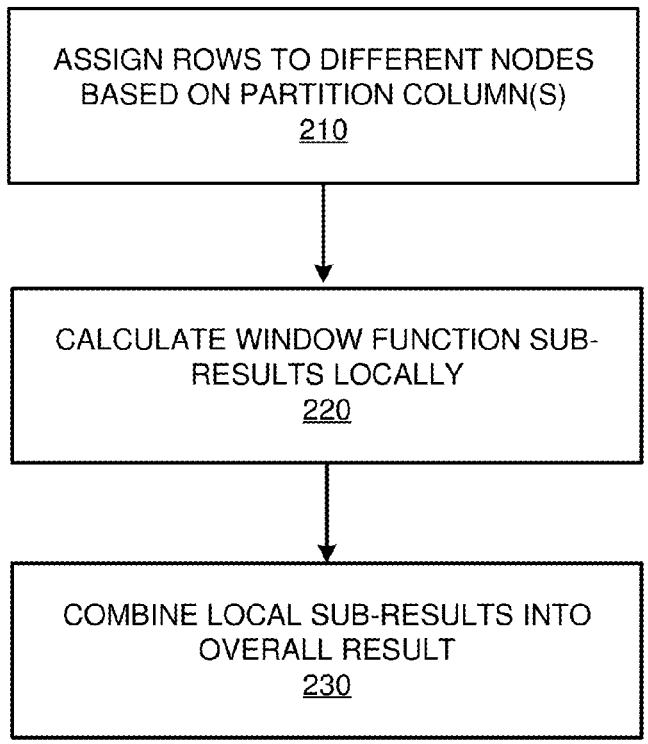
FIG. 2 is a flowchart of an example method of implementing parallelized execution of a window operator.

FIG. 2 is a flowchart of an example method 200 of implementing parallelized execution of a window operator and can be implemented, for example, in the system shown in FIG. 1.

At 210, table rows of a database are assigned to different nodes based on one or more partition columns of the table rows specified in the window operator for which the window function is being calculated. As described herein, assigning the database table rows can include grouping the rows into database row groups that are merged and separated across the different nodes. The nodes then have respective merged-separated row groups on which window function sub-results can be independently calculated. As described herein, more than one node executing in parallel can be used to achieve such assignment.

Rows can be assigned arbitrarily and evenly across the nodes. Input can thus be evenly distributed.

At 220, with the assigned database table rows, window function sub-results are calculated locally at the different nodes (e.g., the calculation is performed via distributed processing). As described herein, such a calculation can include sorting the rows. As described herein, such local calculations, including sorting, can be performed in parallel across the different nodes (e.g., the calculations at one node are performed in parallel with calculation at another node). The calculation at one node can be done independently of the calculation at another, different node (e.g., one calculation does not depend on or interfere with the other). Further, intra-node parallelism can be implemented, and the degree of intra-node parallelism can be controlled as described herein to avoid overloading the nodes.

At 230, the local sub-results are combined into an overall window function result. As described herein, such combination can include unioning the local sub-results together into the overall window function result. Due to the described arrangement, the sub-results can be combined together without modifying the row contents.

Figure 4:
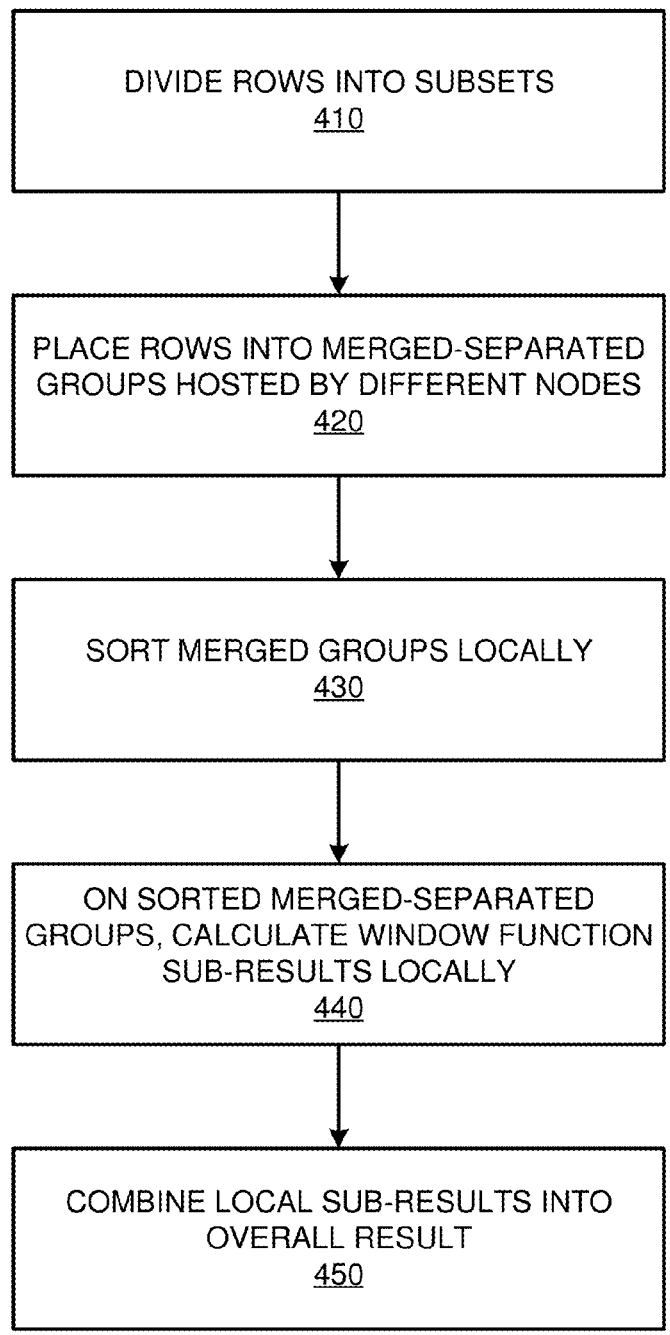
FIG. 4 is a flowchart of an example method implementing parallelized execution of a window operator via sorted merged-separated row groups.

As described herein, the described acts can comprise sub-acts, such as those described for FIG. 4.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Calculation Orchestrator

In any of the examples herein, a window function calculation orchestrator can receive the window operator or a representation of it, and orchestrate execution of the function among a plurality of nodes as shown herein. In practice, the orchestrator can take the form of complied code, interpreted code, just-in-time compilation, or the like. A database management system can include the orchestrator, which can be incorporated into logic and systems for handling other database operators.

Example 5—Example Window Function

In any of the examples herein, the technologies can support a simple window function or a window function with a rich set of features. The syntax of an example Window function in Backus-Naur Form (BNF) is as follows:

```
<window_function> ::= <window_function_type> OVER ( [
PARTITION BY <expression>, ...] <window_order_by_clause>, ...
)
    <window_function_type> ::= RANK( ) | DENSE_RANK( ) |
ROW_NUMBER( ) | <lead_lag_function>
    <lead_lag_function> ::= { LEAD | LAG } ( <expression>
[, <offset> [, <default_expression>]] )
    <window_order_by_clause> ::= ORDER BY
{<window_order_by_expression>}
    <window_order_by_expression> ::= <expression> [ASC |
DESC] [NULLS FIRST | NULLS LAST ]
```

The window function allows result sets of a query (or a logical partition of a query) to be divided into groups of rows called a "window partition." A window partition is specified by one or more expressions in the OVER clause.

Window functions such as RANK, DENSE_RANK, ROW_NUMBER, LEAD, LAG have an ORDER BY clause in the OVER clause.

In a typical window function, result sets are first partitioned as specified by PARTITION BY clause, and then sorted by the ORDER BY clause specification within the window partition. Finally, core window functions are applied to the rows within window partition boundaries.

The one or more partition columns of a window function can be specified via the "PARTITION BY" clause in the operator. Similarly, one or more sorting columns can be specified via the "ORDER BY" clause in the operator.

Example 6—Example Nodes

In any of the examples herein, a node can take the form of a thread, process, core, machine, machine group, or other entity that executes in parallel with other entities. Such entities can be real or virtual (e.g., hyper-threading can emulate additional cores), but are ultimately executed on real hardware.

The node can take the form of a workspace. Intra-node parallelism can initially set the number of available cores to be the number of workspaces. A workspace can have more than one thread according to the degree of parallelism decision described herein (e.g., to implement parallel sorting).

In practice, available hardware may have a performance limit of the number of available nodes that can be used in parallel. For example, although any number of nodes are allowed to be allocated, there may only be 4 available cores. Accordingly, performance begins to degrade if more than 4 cores are allocated. As described herein, such limits can be observed to ensure that a degree of parallelization is controlled to result in superior performance.

Example 7—Example Database

In any of the examples herein, a database can be implemented to be transaction-safe and support enterprise class database features such as point-in-time recovery, backup and restore, and the like. A database can store data organized as a plurality of records in one or more tables.

In practice, a database can be implemented as part of a larger database management system as described herein.

Although the technologies can be applied in any of a number of database environments, an in-memory columnar database such as the HANA database of SAP can be used to implement the described technologies.

Figure 3:
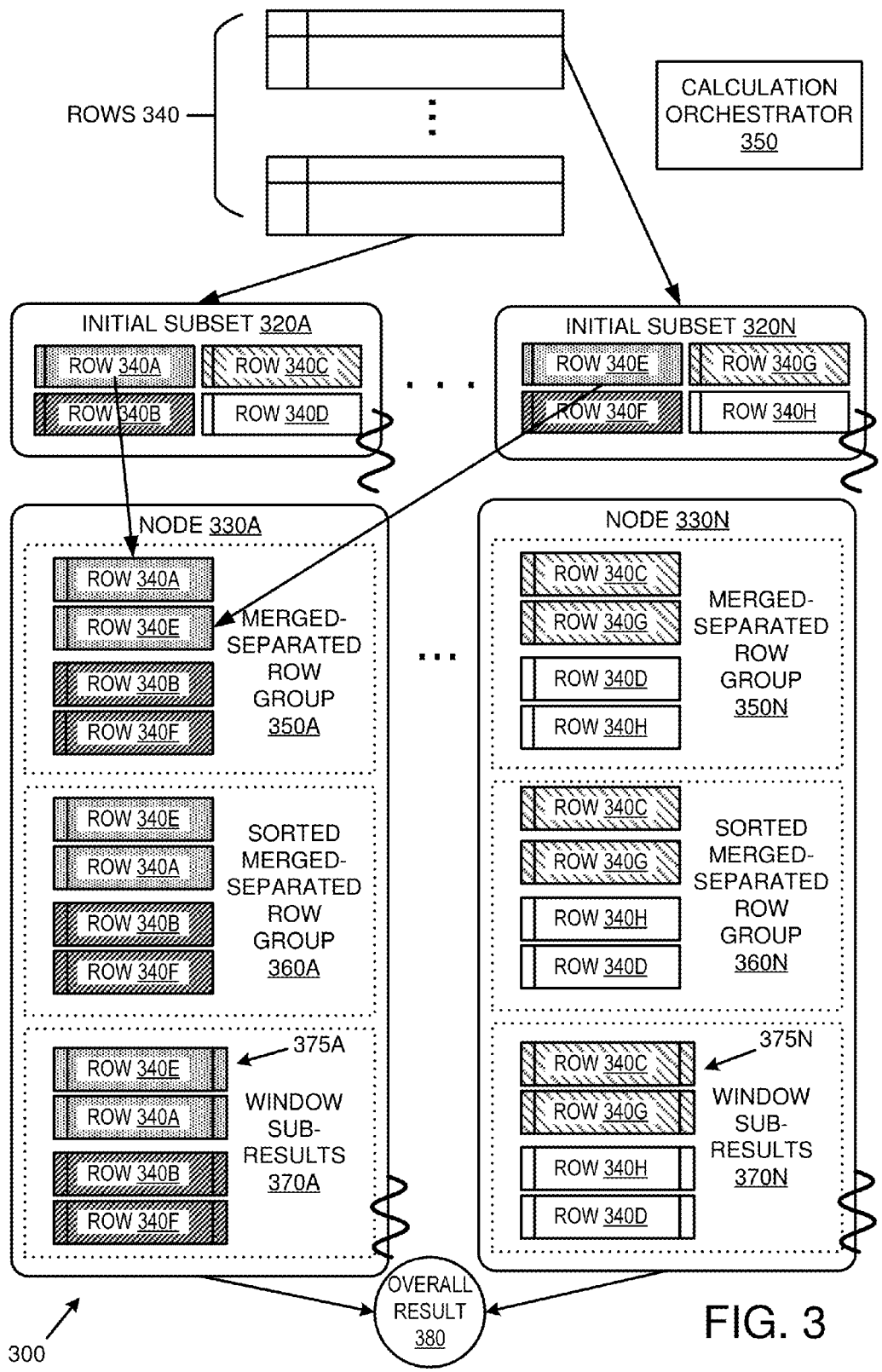
FIG. 3 is a block diagram of an example system implementing parallelized execution of a window operator via sorted merged-separated row groups.

Example 8—Example System Implementing Parallelized Execution of a Window Operator Via Sorted Merged-Separated Row Groups FIG. 3 is a block diagram of an example system 300 implementing parallelized execution of a window operator via sorted merged-separated row groups, as described herein. Such a system 300 can operate similarly to that shown in FIG. 1. Any of the features of system 300 can be incorporated into the system 100 of FIG. 1.

In the example, a window function calculation orchestrator 350 can be configured to receive a window operator and coordinate operation of the described technologies. As described herein, the orchestrator 350 can be configured to coordinate placement of the database table rows into separate initial subsets for assignment to the plurality of different nodes.

The rows 340 can be assigned to the nodes 330A-N via different nodes executing in parallel against the initial subsets 320A-N, which can be created by evenly dividing the input rows 340. The nodes processing the initial subsets 320A-N are sometimes called "child" nodes because they operate to create conditions by which the actual calculating nodes ("window" nodes) can calculate the window function. They are also sometimes called "assigning" nodes because they assign the rows to the window nodes.

The rows 340 can be placed into merged-separated row groups 335A-N at the nodes based on the partition columns (e.g., specified by the "PARTITION BY" clause) of the window operator. The merged-separated row groups 350A-N serve as input to a sort function that outputs the sorted merged-separated row groups 360A-N.

The sorted merged-separated row groups 360A-N can be used for the core calculations of the window function, which are output as window function sub-results 370A-N (e.g., including the appended column(s) 375A-N). The overall result 380 is then based on the window function sub-results 370A-N.

Example 9—Example Method Implementing Parallelized Execution of a Window Operator Via Sorted Merged-Separated Row Groups FIG. 4 is a flowchart of an example method 400 implementing parallelized execution of a window operator via sorted merged-separated row groups and can be implemented, for example, in the systems shown in FIGS. 1 and 3.

The method 400 can operate similarly to that of FIG. 2. For example, act 210 can be implemented as acts 410 and 420 (e.g., assigning the rows to nodes). Act 220 can be implemented as acts 430 and 440. Act 230 can be implemented as act 450.

At 410, the rows are initially divided into separate initial subsets as described herein. Such initial subsets can be chosen to equally distribute the nodes among them (e.g., without regard for the values in the rows). As described herein, initially dividing the rows can evenly divide the rows among the assigning nodes. The actual mechanism used to initially divide the rows can be arbitrary (e.g., it does not depend on the partition column or the sorting column of the window operator). Such a technique is sometimes called a "parallel subtree fetch" because the rows are divided or fetched in parallel.

At 420, the rows are placed into merged-separated row groups hosted by different nodes. Such placement can be based on the partitioning scenario specified by the window operator (e.g., in the "PARTITION BY" clause) as described herein. The partition column of the rows thus decides at which node a row will be placed.

The placement of the rows assigns the row to a node and results in grouping of the rows into merged-separated groups as described herein. The assigning can be performed by a plurality of assigning nodes (e.g., nodes at 320A-N in FIG. 3) executing in parallel. Thus, such grouping can be performed by a plurality of assigning nodes processing respective pluralities of initial subsets of the database table rows.

Calculating window function sub-results locally at the different nodes can include locally sorting merged-separated row groups at the nodes and locally calculating window function sub-results (e.g., the core window function) on the sorted merged-separated row groups.

At 430, the merged-separated groups are sorted locally (e.g., at the nodes in parallel across the nodes). Such sorting can be based on the sorting columns and sorting scenario specified in the window operator (e.g., in the "ORDER BY" clause).

Sorting of the merged-separated row groups can be performed in parallel across the nodes. Further, as described herein, a single group can be sorted by a plurality of sub-nodes. The degree of parallelism of such sub-nodes can be controlled as described herein to avoid overloading the nodes.

At 440, the core window function calculation is performed on the sorted merged-separated row groups locally at the nodes in parallel. As described herein, column(s) can be appended to the rows to hold the result. The output at the nodes are respective window function sub-results.

At 450, the window function sub-results can be combined into an overall result as described herein. Unioning can be used as described herein.

Example 10—Example Merged-Separated Row Groups

In any of the examples herein, rows can be placed into merged-separated row groups at different nodes. Merging and separation can be performed based on the one or more partition columns (e.g., "PARTITION BY") of the window operator. As described herein, such partitioning can be performed in a variety of ways (e.g., value, range, hash, or the like). The partition column (e.g., the column values) of the rows (e.g., as specified by the window operator) thus decides at which node a row will be placed.

Merging places rows with same partition results (e.g., from the window operator PARTITION BY clause) into a same table, and separating prevents different rows with different partition results from being in the same table.

For example, as shown in FIG. 1, rows 140A,E can have a same value for a partition by column. Rows 140B,F can have a same value for a partition column that is different than that of the others. Rows 140C,G can have a same value for a partition column that is different than that of the others. Rows 140D,H can have a same value for a partition column that is different than that of the other rows.

In the example of FIG. 1 (and FIG. 3), range partitioning is used, so rows 140A,B,E,F are in a first same range that is different that rows 140C,D,G,H, which are in a second same range.

The rows are partitioned in a way that rows having the same partition result (e.g., value, range, hash, or the like) for a partition value according to the partition columns of the window operator are kept together. But, rows with different partition results for values of the partition columns are kept apart. Partitioning, merging, and separation can be performed via any partitioning scenario (e.g., value, range, hash, or the like).

Because the row groups are merged-separated as shown herein, independent calculations of window function sub-results can be performed. The calculation at one node does not impact the calculation at another node (e.g., the calculations do not depend on each other, and can be executed in parallel).

Example 11—Example Sorted Merged-Separated Row Groups

In any of the examples herein, merged-separated row groups can be sorted. Such sorting is typically performed before the core window function calculation is performed because the calculation depends on ordering of the rows.

Such sorting can proceed according to the one or more columns and sorting scenario specified in the window operator (e.g., via the "ORDER BY" clause). In some cases, there may be more than one column specified for sorting, more than one clause, or both.

Example 12—Example Initial Subsets

In any of the examples herein, initial subsets of the database table rows can be selected in a variety of ways. For example, even distribution among the nodes can be a goal. Thus, the rows can simply be divided based on the number of nodes (e.g., 1/n of the rows go to respective of the n nodes). Round robin, simply splitting into chunks (e.g., first 1/n of the rows go to the first node), or other techniques can be used to divide the rows so that the rows are evenly distributed among the nodes.

Example 13—Example Window Function Sub-Results

In any of the examples herein, window function sub-results can take the form of partial results of a window function calculation for a window operator. In practice, the resulting rows will have one or more appended or added columns (e.g., rank, count, or the like) depending on what is specified in the window operator.

Such sub-results can be computed independently as described herein. Sub-results can be combined into an overall result of the window function for the window operator via unioning (e.g., concatenating) the sub-results together.

Example 14—Example Window Operator Calculation

Figure 5:
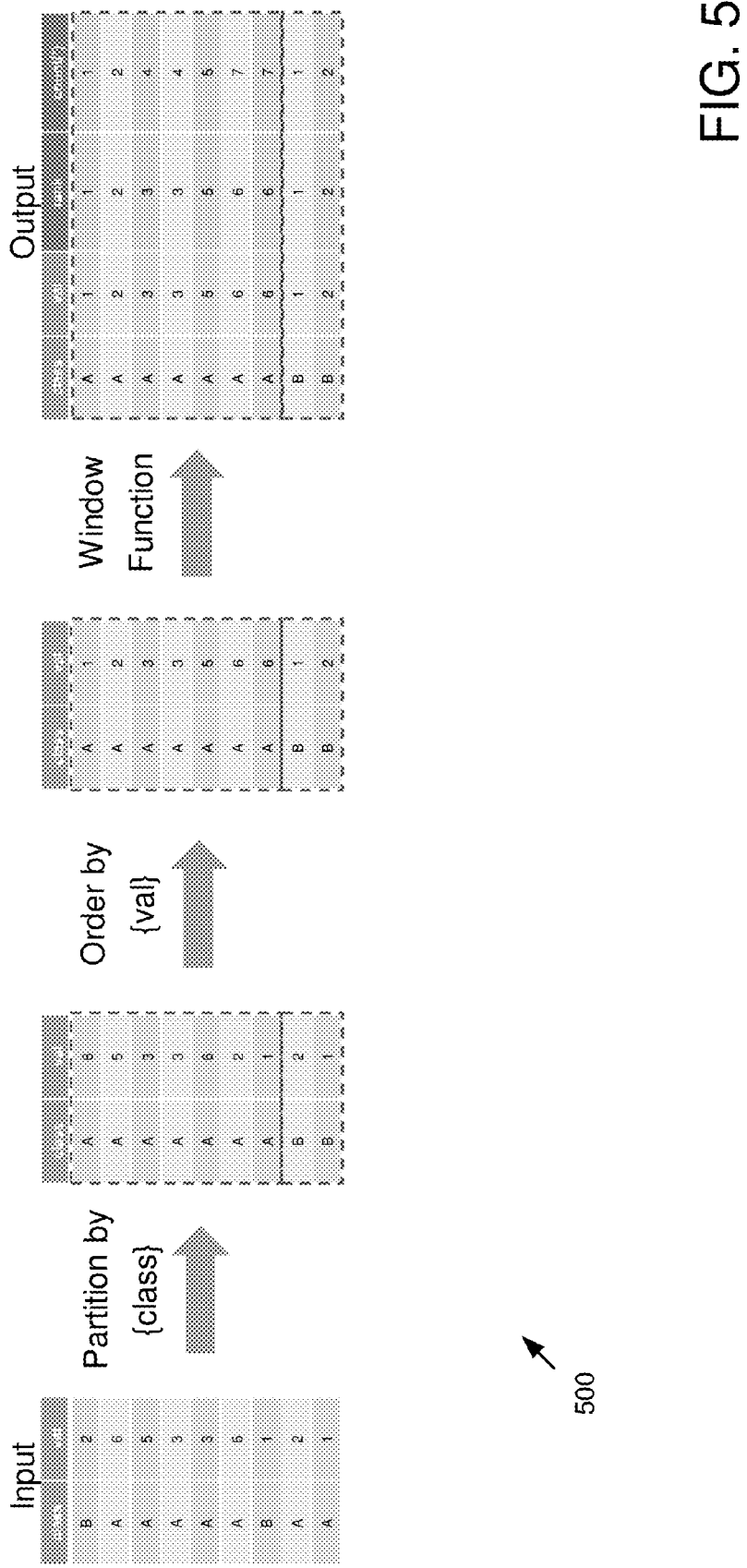
FIG. 5 is an illustration of calculation of a window function of a window operator according to the technologies described herein.

FIG. 5 is an illustration of calculation of a window function of a window operator according to the technologies described herein. In the example, the following query is used to implement the window function.

SELECT class, val, rank( ) OVER (PARTITION BY class ORDER BY val), count(*) OVER (PARTITION BY class ORDER BY val) FROM Input In the Example, value partitioning is used, so the rows having the value "A" for class can be assigned to one node (e.g., node 130A or 330A), and the rows having the value "B" for class can be assigned to another node (e.g., node 130A or 330A).

The rows can then be sorted at the nodes in parallel, and sub-results can be calculated in parallel at the nodes. Results can then be combined as described herein.

The example is for illustration purposes. In practice, many more rows, values, columns, or the like can be supported.

Example 15—Example System Controlling Degree of Parallelism

Figure 6:
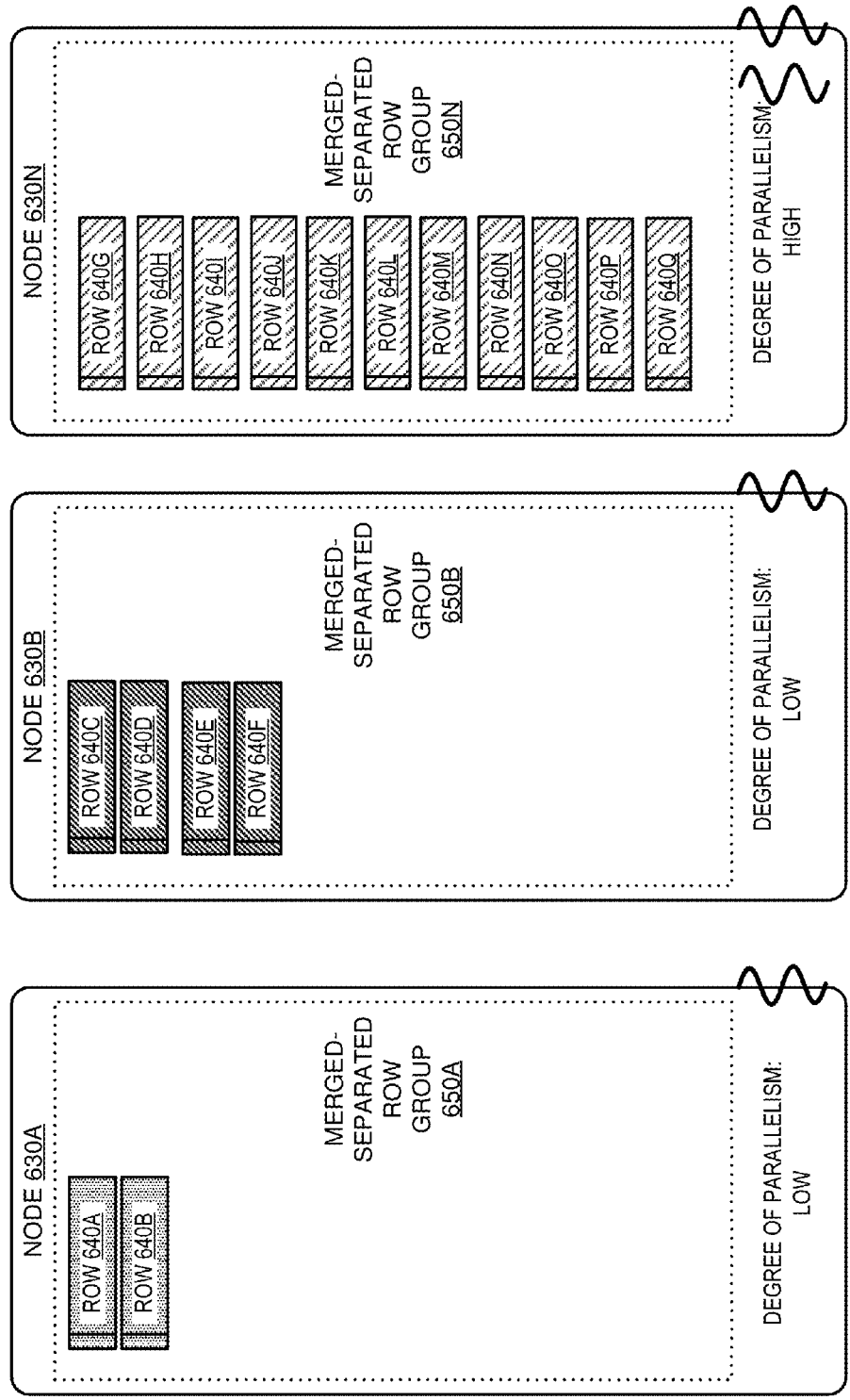
FIG. 6 is a block diagram of an example system implementing control of a degree of parallelism for a parallelized window function calculation.

FIG. 6 is a of an example system 600 implementing control of a degree of parallelism for a parallelized window function calculation and can be used in any of the systems described herein, such as those shown in FIGS. 1 and 3. Such parallelism can parallelize computations within a node (e.g., intra-merged-separated-row-group parallelism) in addition to the parallelism across nodes (e.g., inter-merged-separated-row-group parallelism).

In the example, the rows 640A-Q have been divided into merged-separated row groups 650A-N hosted by different nodes 630A-N as described herein in other examples. However, the data exhibits skewness in that the group 650N is much larger than the other two groups 650A-B.

A degree of parallelism within the different nodes is controlled based on how many rows are at the different nodes 630A-N (e.g., how many rows are in the merged-separated row groups 650A-N at the different nodes 630A-N).

In the example, a low degree has been assigned to nodes 630A-B (e.g., because they have fewer rows), and a high degree of parallelism has been assigned to node 630N (e.g., because it has more rows). So, for the node 630N, multiple sub-nodes (e.g., cores, threads, or the like) may be invoked to perform the window function calculation locally. For example, sorting or other tasks for calculating the window function can be performed by multiple threads at the node 630N.

However, as described herein, the number of overall sub-nodes (e.g., counting a node with no sub-nodes as a single sub-node) can be limited to avoid overloading the sub-nodes.

In practice, there can be more nodes, more rows, and the like.

Example 16—Example Method Controlling Degree of Parallelism

Figure 7:
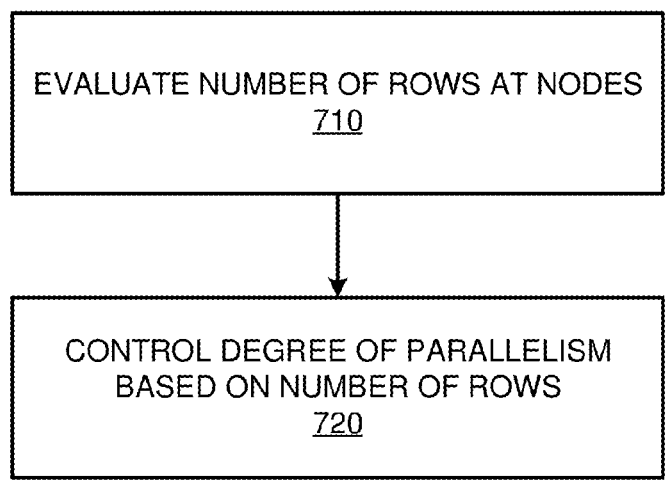
FIG. 7 is a flowchart of an example method of controlling of a degree of parallelism for a parallelized window function calculation.

FIG. 7 is a flowchart of an example method 700 of controlling of a degree of parallelism for a parallelized window function calculation and can be implemented, for example, in the system shown in FIG. 6 and used in conjunction with any of the methods herein (e.g., such as those shown in FIGS. 2 and 4).

At 710, the number of rows (e.g., in the merged-separated row groups) at the different nodes is evaluated. For example, how many rows (e.g., a number of rows or estimate of the number of rows) are at the different nodes can be determined. Such a determination can result in a per-node indication of the number of rows at the nodes.

At 720, the degree of parallelism is controlled based on how many rows are at the different nodes. For example, a number of sub-nodes (e.g., multiple nodes executing on a single merged-separated row group) can be limited to a threshold (e.g., restricted to avoid going over a threshold). Thus, more than one thread or core can be assigned to tasks such as sorting at a node so that the sorting is computed in parallel within the node, and the node is also executing in parallel with other nodes.

Such nodes can be provided by a single machine or groups of machines with limited threads or cores. Accordingly, uncontrolled parallelism can result in poor performance (e.g., more cores are assigned than are actually available).

Controlling the degree of parallelism can involve dividing a given number of overall sub-nodes among the nodes (e.g., among the merged-separated row groups). A proportional or semi-proportional assignment of available sub-nodes can be used (e.g., sub-nodes allocated to a node are based on how many merged-separated rows are at the node). Thus, the sub-node distribution can mirror or approximate the row distribution to account for skewness in the data.

One heuristic for determining how to control parallelism limits parallelism to a degree of parallelism of 1 (e.g., no additional sub nodes) for a node that has rows under a threshold. If the number of rows meets the threshold, the degree of parallelism is set based on the percentage of rows at the node and overall available sub-nodes.

For example,

Degree of Parallelism$_{node}$=1 if rows in merged-separated row group at node is under threshold Degree of Parallelism$_{node}$=rows in merged-separated row group at node/total rows*number of available sub-nodes (e.g., cores)

Various other heuristics can be applied. The degree of parallelism can be controlled by limiting a number of overall sub-nodes to a given threshold (e.g., the number of available nodes). The number of available nodes can be set to reflect a number that results in superior performance. Some systems may allow allocation to additional nodes, even though such nodes are not actually available.

By controlling parallelism as described, overloading the available nodes can be avoided.

Example 17—Example Performance Gains

Figure 8:
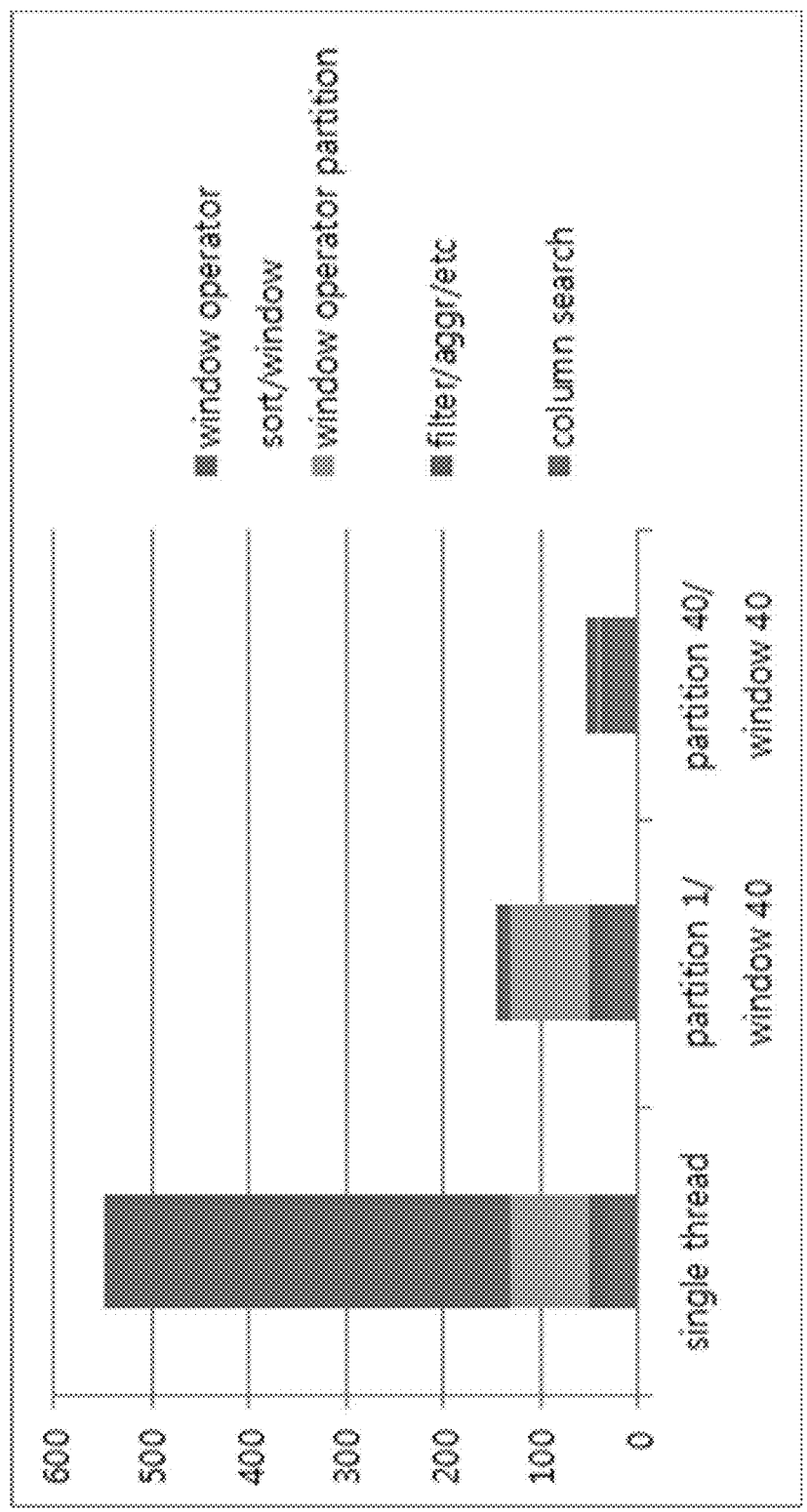
FIG. 8 is a graph showing results of parallelization of a window function calculation.

FIG. 8 is a graph 800 showing results of parallelization of a window function calculation. In the example, the following query was used:

```
select count(*) from
(
    select base_sku
       ,else_sku
       ,relation
       ,std
       ,row_number( ) over (partition by base_sku order by relation desc,
    else_sku) as rn
       from prd.rmd_kk_merge
) as t1
where rn <= 100;
```

In a base table rmd_kk_merge, there were 118,515,984 records. 21,373,388 records resulted from the calculation. In a 1 TB machine with 40 cores, parallelized execution time was reduced to 54 seconds compared to 549 seconds in a single thread.

TABLE

Execution Time by Task

|  |  | single thread | multi thread (partition 1, window 40) | multi thread (partition 40, window 40) |
|---|---|---|---|---|
| Column Table scan |  | 30 sec | 30 sec | 30 sec |
| filter/aggr/etc |  | 20 sec | 20 sec | 9 sec |
| window operator | partition | 83 sec | 83 sec | 3 sec |
|  | sort/window | 416 sec | 12 sec | 12 sec |
| total execution time |  | 549 sec | 145 sec | 54 sec |
| SpeedUp |  | — | 379% | 1017% |

The results are shown graphically in FIG. 8. A single thread, multi-thread (single thread assigning rows and 40 threads performing the calculation) and multi-thread (40 threads assigning rows and 40 threads performing the calculation) implementation were compared.

Example 18—Example Advantages

As described herein, performance can be greatly improved and overall computation time to compute a window function can be greatly reduced by implementing the technologies described herein.

Example 19—Example Computing Systems

Figure 9:
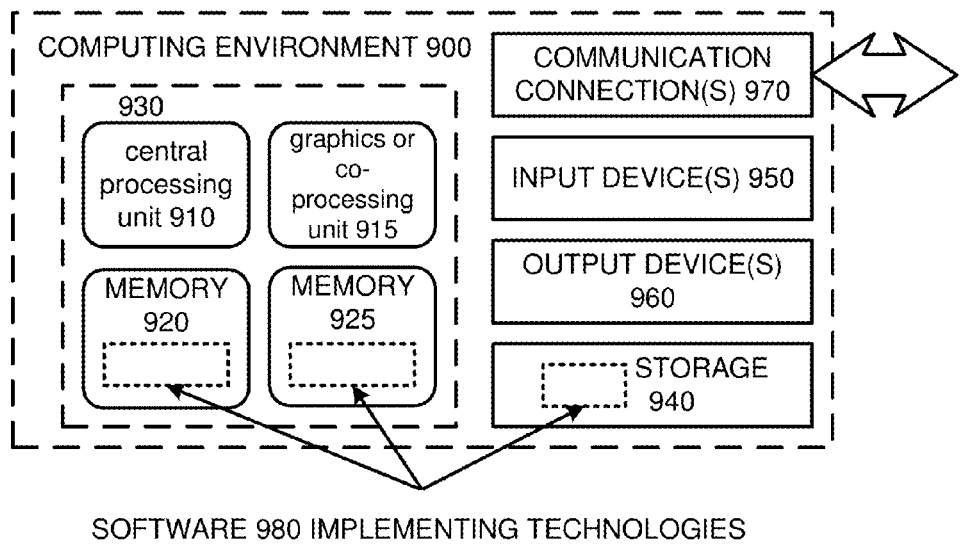
FIG. 9 is a diagram of an example computing system in which described embodiments can be implemented.

FIG. 9 illustrates a generalized example of a suitable computing system 900 in which several of the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 20—Example Cloud-Supported Environment

Figure 10:
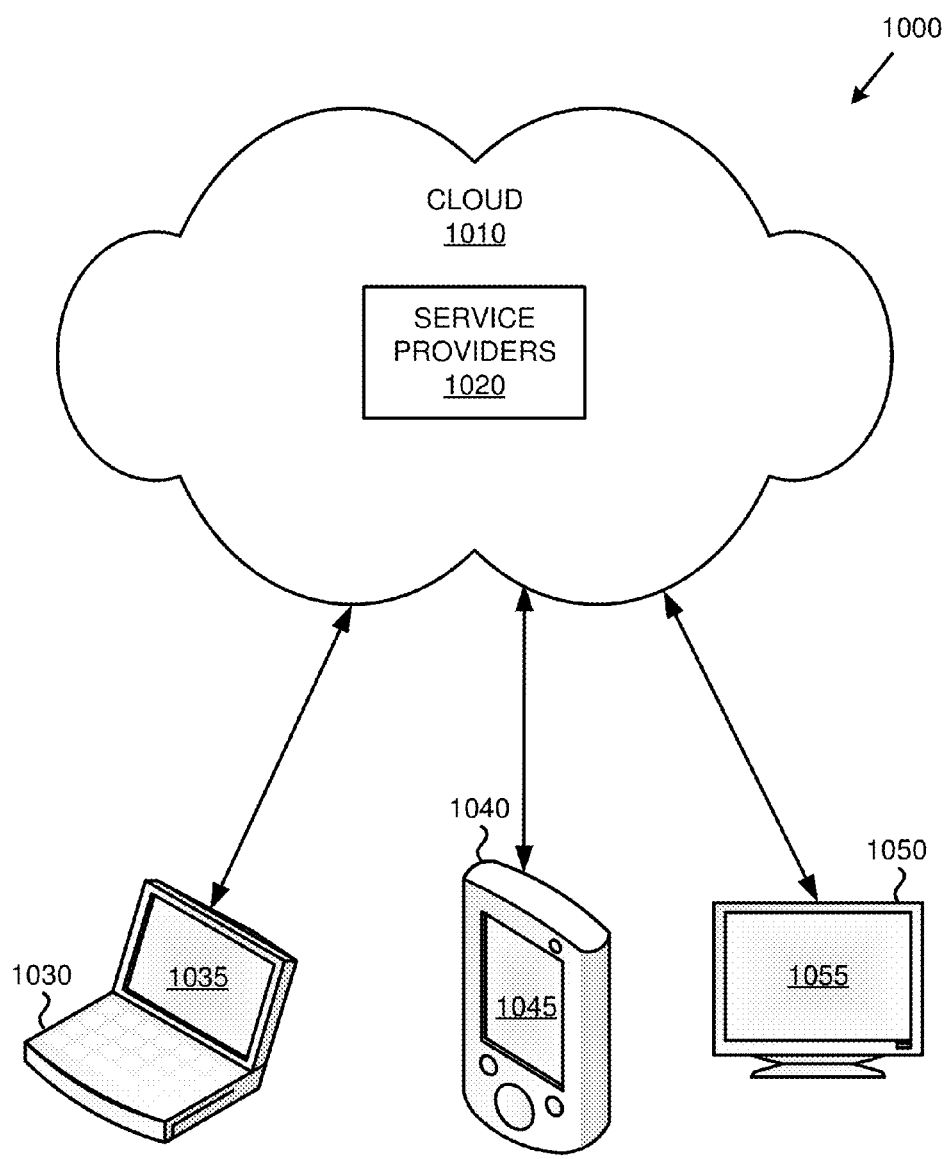
FIG. 10 is an example cloud-support environment that can be used in conjunction with the technologies described herein.

In example environment 1000 of FIG. 10, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touch screen capabilities. Touchscreens can accept input in different ways. For example, capacitive touch-screens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touch screen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example 21—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computer, the method comprising:
responsive to receiving a window function, parallelizing execution of the window function, wherein parallelizing execution of the window function comprises assigning table rows of a database into merged-separated row groups at different nodes based on one or more partition columns of the table rows specified in a window operator, wherein a merged-separated row group comprises one or more tables and assigning comprises merging rows with same partition results into a same table and separating rows with different partition results into separate tables;
responsive to the assigning, controlling a degree of parallelism within the different nodes, wherein controlling the degree of parallelism within the different nodes comprises calculating the degree of parallelism for a given node based on how many rows are at the given node;
based on the degree of parallelism at the different nodes, further parallelizing execution of the window function at one or more of the different nodes, wherein the further parallelizing comprises dividing the one or more different nodes into subnodes, wherein computations within the one or more different nodes are parallelized across the respective subnodes;
within the merged-separated row groups, calculating sub-results for the window function locally at the different nodes and subnodes for tables of the respective merged-separated row groups, wherein parallelism is implemented for a merged-separated row group within the one or more different nodes by the respective subnodes in addition to across the different nodes; and
combining the local window function sub-results into an overall window function result of the window operator.

2. The method of claim 1 further comprising:
initially dividing the table rows into separate initial subsets;
wherein the assigning is performed by a plurality of assigning nodes executing in parallel.

3. The method of claim 2 wherein:
initially dividing the table rows comprises evenly dividing the table rows among the assigning nodes.

4. The method of claim 1, further comprising:
determining how many rows are at the different nodes.

5. The method of claim 1, wherein a number of overall subnodes is limited to a subnode threshold.

6. The method of claim 1 wherein:
calculating window function sub-results locally at the different nodes comprises:
locally sorting merged-separated row groups at the nodes; and
locally calculating window function sub-results on the sorted merged-separated row groups.

7. The method of claim 6 wherein:
locally sorting the merged-separated row groups at the nodes is performed in parallel.

8. The method of claim 1 wherein:
combining the local window function sub-results into an overall window function result of the window operator comprises:
unioning the local window function sub-results into the overall window function result.

9. A system comprising:
a database table comprising a plurality of database table rows comprising a plurality of columns;
a window function calculation orchestrator configured to receive a window operator comprising one or more partition columns of the database table and one or more sorting columns of the database table, wherein the window function calculation orchestrator is configured to assign the database table rows into merged-separated row groups at a plurality of different nodes based on the one or more partition columns, wherein a merged-separated row group comprises one or more tables and assigning comprises merging rows with same partition results into a same table and separating rows with different partition results into separate tables, to determine how many rows are at the different nodes, to control a degree of parallelism, responsive to the assigning, within a given node out of the different nodes based on how many rows are at the given node, and to allocate subnodes to the different nodes based on the degree of parallelism at the different nodes and accounting for skewness in the row assignment, wherein controlling the degree of parallelism within the given node comprises calculating the degree of parallelism for the given node based on how many rows are at the given node compared to a row threshold, and different degrees of parallelism are calculated for respective different nodes, wherein if a number of rows at the given node meets the row threshold, the degree of parallelism is set based on percentage of rows at the given node and overall available subnodes;
the plurality of different nodes and subnodes, wherein the plurality of different nodes and subnodes are configured to calculate window function sub-results locally of the window operator for tables of the respective merged-separated row groups, and computations within the given node are parallelized for a merged-separated row group within a node in addition to across nodes; and
an overall window function result of the window operator constructed from the window function sub-results at the different nodes.

10. One or more non-transitory computer-readable media comprising computer-executable instructions that when executed by a computing system perform a method comprising:

receiving rows of a database table comprising a plurality of columns;

receiving an indication that a window function is to be performed on the rows, wherein the indication comprises a window operator comprising at least one partition column and at least one sorting column, wherein the partition column is a column of the database table, and the sorting column is a column of the database table;

dividing the rows among a plurality of assigning nodes as initial subsets of the rows;

via the assigning nodes, assigning in parallel the initial subsets of the rows to respective different window nodes as different merged-separated row groups according to row values of the partition column, wherein a merged-separated row group comprises one or more tables and the assigning nodes merge rows with same partition results into a same table and separate rows with different partition results into separate tables;

responsive to the assigning, controlling a degree of parallelism within the respective different window nodes, wherein controlling the degree of parallelism within the respective different window nodes comprises calculating degrees of parallelism for the respective different window nodes based on how many rows are at the respective different window nodes compared to a row threshold, wherein, responsive to a number of rows at the given node meeting the row threshold, the degree of parallelism is set based on percentage of rows at the given node and overall available subnodes;

allocating subnodes to the at least one of the window nodes based on the degree of parallelism for the at least one of the window nodes, wherein computations within the at least one of the window nodes are parallelized via the allocated subnodes, further wherein the number of subnodes allocated is limited to a subnode threshold;

via the different window nodes and allocated subnodes, sorting the one or more respective tables of the different merged-separated row groups of the different window nodes according to the sorting column, wherein the sorting is done in parallel across the different window nodes and intra-merged-separated-row group parallelism is implemented within the at least one of the window nodes via the allocated subnodes;

via the different window nodes and allocated subnodes, locally generating window function sub-results for the respective tables of the different sorted merged-separated row groups of the different window nodes, wherein the generating is done in parallel across the different window nodes and intra-merged-separated-row group parallelism is implemented within the at least one of the window nodes via the allocated subnodes; and combining the window function sub-results into an overall window function result for the window operator.

11. The one or more non-transitory computer-readable media of claim 10, wherein the subnode threshold comprises a number of available computing resources.

12. The method of claim 1, wherein the calculated degree of parallelism of a particular node indicates that the particular node is not to be divided into subnodes; and
based on the calculated degree of parallelism of the particular node, not dividing the particular node into subnodes.

13. The method of claim 1 further comprising:
assigning the subnodes to different cores or threads for execution in parallel, whereby intra-node parallelism is implemented.

14. The method of claim 1, wherein different degrees of parallelism are calculated for the different nodes based on how many rows are at the nodes.

15. The method of claim 1, wherein calculating the degree of parallelism for a given node is further based on how many rows are at the given node compared to a row threshold.

16. The method of claim 15, wherein if a number of rows at the given node meets the row threshold, the degree of parallelism is set based on percentage of rows at the given node and overall available subnodes.

17. The method of claim 5, wherein the subnode threshold comprises a number of available computing resources.

18. The system of claim 9, wherein the number of subnodes allocated is limited to a subnode threshold.

19. The system of 27, wherein the subnode threshold comprises a number of available computing resources.

20. The system of claim 9, wherein the plurality of nodes are further configured to locally sort the tables of the merged-separated row groups.

* * * * *